United States Patent [19]

Sambucetti et al.

[11] 4,026,713

[45] May 31, 1977

[54] WATER BASED MAGNETIC INKS AND THE MANUFACTURE THEREOF

[75] Inventors: Carlos Juan Sambucetti, Mohegan Lake; Joseph William Mitchell, Montrose, both of N.Y.

[73] Assignee: International Business Machines Corporation, Armonk, N.Y.

[22] Filed: June 12, 1975

[21] Appl. No.: 586,444

[52] U.S. Cl. .................................. 106/19; 106/20; 106/22; 106/23; 252/62.1 P; 252/62.1 L

[51] Int. Cl.[2] .......................................... C09D 11/02

[58] Field of Search ............. 106/20 M, 22, 32, 23; 252/62.1 P, 62.1 L

[56] References Cited

UNITED STATES PATENTS

| | | | |
|---|---|---|---|
| 3,507,794 | 4/1970 | Fauser et al. | 252/62.1 L |
| 3,528,097 | 9/1970 | Otsuka et al. | 252/62.1 L |
| 3,705,043 | 12/1972 | Zabiak | 106/20 |
| 3,846,141 | 11/1974 | Ostergren et al. | 106/22 |
| 3,907,694 | 9/1975 | Lu | 252/62.1 L |

*Primary Examiner*—J. Ziegler
*Attorney, Agent, or Firm*—Sughrue, Rothwell, Mion, Zinn & Macpeak

[57] ABSTRACT

Improvements in water based magnetic inks of the type containing non-ionic, cationic and/or anionic surfactants by the inclusion of glycerol, non-volatile solvent such as mono-lower alkyl ethers of ethylene glycol and low molecular weight polyethylene diols.

22 Claims, No Drawings

WATER BASED MAGNETIC INKS AND THE MANUFACTURE THEREOF

BACKGROUND OF THE INVENTION

Magnetic inks are known formed of magnetic material dispersed in a liquid carrier.

The magnetic material is typically magnetite ($Fe_3O_4$), $\nu$—$Fe_2O_3$ and the like. Other magnetic material based on cobalt, chromium dioxide, and the like is contemplated by the present invention. The magnetic material, in extremely finely divided form of the order of submicron size, is more or less permanently suspended in a liquid carrier with the aid of dispersing agents, surfactants, and the like to form a colloidal magnetic fluid, typically referred to as a ferrofluid.

The liquid carrier employed is usually a non-aqueous solvent, often an organic solvent of the non-polar type. Examples of non-aqueous solvents usable in the preparation of ferrofluids are aliphatic hydrocarbons, such as heptane, decane, mineral oil, kerosene, and the like, halogenated hydrocarbons such as carbon tetrachloride, trichloroethylene and the like, aromatic solvents such as benzene, toluene and the like, silicone oils, etc.

The dispersing aid is included in the ferrofluid formulation to prevent aggregation of magnetic material particles in the non-aqueous solvent, which could lead to flocculation and deposition out of suspension of magnetic material. The dispersing aid, which may be one or more surfactants, wetting agents and the like, is applied to coat the surfaces of the individual magnetic particles so as to form a coating around the individual magnetic particles to prevent agglomeration or flocculation due to attraction therebetween. Aliphatic carboxylic acids having about 8 to 24 carbon atoms are known as dispersing aids for magnetic material, such as magnetite, to be colloidally suspended in non-aqueous solvents. In this regard, see U.S. Pat. Nos. 3,531,413 and 3,764,540.

For certain applications of magnetic inks it is desirable to employ water as the carrier fluid for the magnetic material in place of the more commonly used non-aqueous solvents. The present invention is directed to the preparation of colloidal suspensions of magnetic material, such as magnetite, in an aqueous medium, and the ferrofluid so produced.

More particularly, the present invention is directed to improvements in aqueous based ferrofluids wherein anionic, cationic and/or non-ionic surface active agents are employed as suspending and dispersant aids for the magnetic material. Preferred surface active agent combinations are as disclosed in commonly-assigned copending application Ser. No. 507,850, filed Sept. 20, 1974, now U.S. Pat. No. 3,990,981 by Kovac et al, the entire disclosure which is incorporated herein by reference. The copending application is directed to rendering finely divided magnetic particles water dispersible through the aid of a combination of one or more non-ionic wetting agents and one or more cationic surface active agents.

It has been determined that aqueous magnetic inks involving the use of anionic, non-ionic or cationic surface active agents present certain problems when employed in magnetic jet ink applications. More specifically, problems have been encountered with respect to filterability, evaporation rate and drying time of the aqueous based ink.

U.S. Pat. No. 3,846,141 discloses, as a humectant system for aqueous inks containing water soluble dyes, a mixture of lower alkoxy triglycol with at least one of a polyethylene glycol, a lower alkyl ether of diethylene glycol and glycerol.

U.S. Pat. No. 1,404,345 discloses the addition of glycerin to an aqueous colloidal suspension of ink pigment to control drying of the ink.

Accordingly, it is an object of the present invention to provide a method for forming a colloidal suspension of magnetic particles, particularly magnetite, in water.

Another object of this invention is to provide an aqueous based magnetic ink characterized by good filterability, fast drying on paper coupled with slow evaporation of the ink itself and permanence of indicia on the printed substrate.

A further object of this invention is to provide a specific combination of dispersing aids and additives which can be employed to produce the abovedescribed aqueous based magnetic ink.

SUMMARY OF THE INVENTION

In accordance with the present invention, aqueous ferrofluids wherein a magnetic material is colloidally dispersed through the use of anionic, non-ionic and/or cationic surface active agents are provided comprising (1) glycerol, (2) a lower alkyl mono ether of ethylene glycol (2-alkoxy ethanol) and (3) polyethylene diol having a molecular weight below 200 or the monomethyl ether thereof.

In accordance with certain preferred embodiments of the present invention, finely divided magnetic particles are rendered water-dispersible through the aid of a combination of one or more non-ionic wetting agents and one or more cationic surface active agents as disclosed in copending Ser. No. 507,850, filed Sept. 20, 1974, now U.S. Pat. No. 3,990,981.

The glycerol component used in the present invention improves filterability of the ferrofluid, i.e., the ink freely passes through a 0.8 micron filter. However, the glycerol retards drying of the ink on the printed substrate, generally paper.

The lower alkyl monoether of ethylene glycol or 2-alkoxy ethanol increases adsorption of the ink on the paper, thus overcoming this undesired effect of glycerol.

The third component of the combination of ingredients used in the present invention, the low-molecular weight polyethylene glycol or monomethyl ether thereof, imparts lubricity to the fluid and prevents rapid evaporation of the ink itself. These factors prevent nozzle clogging occuring when only the first two components of the present invention are employed.

DETAILED DESCRIPTION OF THE INVENTION

Magnetic inks are used in magnetic ink jet printing where a stream of ink is supplied under pressure and periodically interrupted to produce droplets, which impinge upon a sheet of moving paper. To obtain printing on the paper by the ink, it is necessary that the droplets be spaced substantially uniform distances from each other, be of uniform size, and be formed at a high rate such as about $10^5$ per second.

Magnetic ink is preferably isotropic and virtually free of remanence. Magnetic ink suitable for ink jet printing is described in this invention.

In order to prepare an aqueous based magnetic printing ink, it is necessary to have available magnetic particles of small size characterized by high magnetic moment. Using magnetite as an example, the particle size range should be about 50 to 300 A, preferably about 75 to 200 A. Magnetic moment, bearing in mind the above disclosed use for aqueous magnetic inks of the present invention, should desirably be within the range of about 65 to 80 emu./gram of dried, e.g., air or vacuum, magnetic material, preferably about 70 emu./gram. Dispersed magnetite of size and magnetic moment disclosed above, is available from a number of commercial sources such as Sherritt Gordon Mines, Ltd., Canada, or may be prepared in a manner well known in the art. For example, the following general process may be employed.

Ferric chloride and ferrous chloride are dissolved in separate bodies of water to form solutions thereof. The solutions are mixed in amounts to maintain the molar ratio $Fe^{+3}/Fe^{+2}$ slightly under the theoretical value of 2.0 without de-aerating the solutions. Oxygen in the solution will oxidize some ferrous ions to ferric ions. Magnetite, $Fe_3O_4$, can be formed by chemical precipitation of the ferrous-ferric mixture with base, such as ammonium hydroxide. In order to favor a high rate of magnetite nucleation coupled with a slow rate of particle growth, chemical precipitation can be carried out at low temperatures, for example, in an ultrasonic bath maintained at about 5° to 12° C. The pH of the mixture during chemical precipitation for deposition of magnetite is maintained between about 8.9 and 10.2, preferred pH being 9.5, with the amount of hydroxide used being adjusted accordingly.

In order to aid in the prevention of agglomeration of magnetite during and immediately subsequent to chemical precipitation, a dispersing aid is added to the precipitation mixture within a few seconds of hydroxide addition. Ancillary to agglomeration prevention, the dispersing aid will also help maintain desired small particle size. The dispersing aid is selected from those materials known to prevent inter-particle attraction between individual magnetite particles. An 8 to 24 carbon atom aliphatic monocarboxylic acid such as oleic acid, linoleic acid, linolenic acid, myristolenic acid or palmitoleic acid, can be employed for this purpose. Finally, the carboxylic acid coated magnetic particles in aqueous suspension are heated to about 60° to 100° C., to increase the magnetic moment thereof and the pH of the mixture is decreased from about 8 to 6 to aid in precipitation of the coated magnetite particles. Then, the particles are rinsed with distilled water to remove $NH_4Cl$ salt and separation can be carried out in any conventional manner, such as by use of the ultracentrifuge.

Once magnetite particles of the preferred 75 to 200 A size have been obtained or prepared as above, they are rendered water dispersible to form a colloidal dispersion in water by dispersing them in combination with anionic, cationic and/or non-ionic surface active agents. As one preferred example, the two component surface active agent combination of copending Ser. No. 507,850, filed Sept. 20, 1974, now U.S. Pat. No. 3,990,981 will now be described. Non-ionic and cationic agents are employed in combination.

The amount and type of non-ionic wetting agent is selected to provide an interfacial tension between magnetite particles and water at about 24 to 36 dynes/cm, preferably about 30 to 34 dynes per cm. Generally, about 5 to 10 weight percent based on magnetite of non-ionic wetting agent will be sufficient, preferably about 7 weight percent.

The non-ionic wetting agent is selected to provide a bridge between the lyophobic disperse phase, i.e., magnetite, and the dispersion medium of water. Non-ionics based on polyoxyethylene, due to the hydrophilic nature of the polyoxyethylene chains, are especially suitable. Alkylarylpolyether alcohols or alkylphenol ethers of polyethylene glycol wherein the alkyl chain is of $C_8$ to $C_{45}$ and containing from 8 to 15 oxyethylene units can be employed, for example, of the formula:

wherein R is the alkyl chain and x designates the number of oxyethylene units present. The octyl or nonyl compounds wherein *x* is 9 or 10, are preferred due to their excellent water solubility and reasonable viscosity, for example, nonyl phenol or tertiary octyl phenol polyoxyethylenated with 9 to 10 moles of ethylene oxide.

The amount and type of cationic surface active agent is selected to impart a zeta potential of about +30 to +100 mv, preferably about +60 to +90 mv, to the magnetite particles.

Usable cationics are quarternary compounds and amines, such as the quarternary ammonium salts, alkyl amines, quarternary sulfonium compounds, quarternary phosphonium compounds and ethoxylated quarternary ammonium compounds.

These cationics will generally be used in the concentration of 2–8% based on magnetite, preferably 6% by weight.

As examples of quarternary ammonium salts, there may be mentioned compounds of the formula:

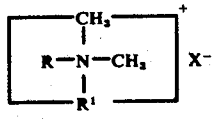

wherein R and $R^1$ are the same or different and are about 8 to 24 carbon atom branched or straight chain alkyl or benzyl radicals and preferably R and $R^1$ are $C_{12}$ to $C_{18}$ groups. A minor amount of unsaturation may be present in R and $R^1$. X is a suitable anion such as a halogen ion.

As examples of sulfonium compounds, there may be mentioned compounds of the formula:

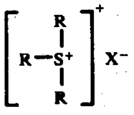

As examples of phosphonium cationics there may be mentioned compounds of the formula:

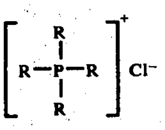

In the above sulfonium and phosphonium compounds the R groups are the same or different $C_1$ to $C_{24}$ alkyl groups, with preferably two of the R groups being methyl and the other(s) being at least $C_8$.

As examples of amine cationics, there may be mentioned long chain alkylamines. Since these surfactants are pH sensitive, care must be exercised in their use.

Although aqueous based magnetic inks containing a combination of non-ionic and cationic surfactants as dispersing aids are characterized by highly acceptable magnetic moment, (preferably 25 emu./gram or higher), viscosity (preferably less than 10 centipoises) and zeta potential (preferably above 70 millivolts indicating good colloid stability), additional characteristics are required for commercial use in high speed magnetic jet printing. Important parameters to be met are as follows:

a. The ink must pass freely through a 0.8 micron filter, and this characteristic must remain constant and independent of time (no appreciable decrease in mass-flow rate with time).
b. The ink must possess a low evaporation rate; otherwise, the magnetic moment and the stability of the ink will deteriorate upon recycling in the printing device.
c. The ink must not dry quickly on surfaces when exposed to air; otherwise, it will produce accumulation of solid matter in the catcher and will clog nozzles.
d. The ink must dry quickly on paper, for example, within a few seconds for individual drops of about 5–7 mil diameter.

It has been found that aqueous ferrofluids containing surfactants have difficulty in flowing through 0.8 micron filters for any length of time. Often, partial clogging occurs initially or only after one to two ounces of fluid has passed through the filter.

Lack of filterability is pronounced when non-ionic surfactants are employed, such as in combination with cationics to disperse carboxylic acid coated magnetic particles. Although the reasons for poor filterability are not entirely understood, it is theorized that when non-ionics are involved, the "critical micelle concentration" of the fluid is reached. By "critical micelle concentration" is meant surfactant concentration in the fluid at which large colloidal aggregates, units or clusters begin to form. Such clusters, either lamellar or spherical, can typically contain about 100 tightly bound units. Assuming an average unit size of 100 A, 100 units should correspond to a micelle size of about 10,000 A which would be large enough to clog a 0.8 micron filter. Regardless of the mechanism causing poor filterability, it has been found that aqueous based magnetic inks containing surfactants, particularly non-ionic surfactants, are modified into readily filterable ink by hot digestion with 3–12% by volume glycerol. The hot digestion procedure involves slow addition of glycerol to the ink with constant stirring and heating. After treatment, the fluid filters at a very fast rate through a 0.8 micron filter, leaving no residue. This characteristic does not change with time, i.e. filterability remains the same for at least a ten day period. Although not bound by such explanation, the effect of glycerol may be explanable by one of two mechanisms a) glycerol may solubilize some unreacted component still present in the ink, probably non-ionic when present or b) the addition of glycerol may shift the value for the critical micelle concentration of the colloid, allowing the system to achieve more stable equilibrium and preventing generation of micelles. Proposal *b* is believed to be the active mechanism, perhaps involving reduction of polarity of the system.

Apart from converting the fluid into a filterable ink, the addition of the glycerol also significantly reduces the evaporation rate of the ink so that upon recycling very minimum change occurs in the ink magnetic moment through fluid loss by evaporation, and prevents the ink from drying too fast, thereby avoiding crust formation and reducing nozzle clogging.

The glycerol modification does not change the magnetic moment or the viscosity of the ink, as will be seen by the results shown below. The glycerol modification converts diverse fluids made with different surfactants to filterable inks, indicating that the phenomenon has general applicability and may be related to shifting of the critical micelle concentration of the colloid.

Hot digestion is carried out by addition of the glycerol to the ink with constant stirring, say over a period of about 1 hour to 2 hours. Heating is carried out at about 60° to 90° C, preferably about 70° C, for about 1 hour to 4 hours, preferably 1½ to 2 hours. The above are only general guidelines regarding time and temperatures of hot digestion. The fluid may be heated during addition of the glycerol thereto.

A disadvantage of the glycerol modification is the resulting slow drying of the ink on paper. In effect, as the evaporation rate of the ink is drastically reduced, the droplets deposited on the paper tend to smear because of retention on the paper surface. This problem is corrected by the addition of a small amount, 1 to 7% by volume of the ink formation, of a non-volatile solvent to the ink which enhances the adsorption of the ink on paper.

The non-volatile solvent is one or more lower alkyl mono ethers of ethylene glycol or 2-alkoxy ethanol. By lower alkyl is meant 1 to 4 carbon atom alkyl groups, branched or straight chain. Representative non-volatile solvents are ethylene glycol monomethyl ether, ethylene glycol monoethyl ether and ethylene glycol mono n-butyl ether. The ethylene glycol n-butyl ether is preferred at this time (EGMBE), because of its lower volatility (higher boiling point). Further, EGMBE gives the ink antifoaming properties.

At a preferred concentration of about 3% of EGMBE, drying times of about 1 to 2 seconds are achieved. The printed dots do not smear even upon wet rubbing. The non-volatile solvent does not adversely effect the magnetic moment nor the viscosity of the ink. Printed dot size and quality are comparable to that obtained without the presence of the nonvolatile solvent.

To illustrate the effect of non-volatile solvent on the glycerol modified ink, the following data in presented.

The unmodified ink is prepared from oleic acid coated magnetite particles using Triton N-101 (a polyoxy ethylenated nonyl phenol containing 9 to 10 mols ethylene oxide per mol available from Rohm and Haas Co) and Arquad (dimethyldialkyl quarternary ammonium compound available from Armak Chemical Division of Alzona, Inc., Chicago, Illinois) as a non-ionic - cationic surfactant dispersing aid combination.

| | Unmodified | +8% Glycerol | +8% Glycerol, 3% EGMBE |
|---|---|---|---|
| Moment | 26.1 | 24.5* | 24.0* |

-continued

| | Unmodified | +8% Glycerol | +8% Glycerol, 3% EGMBE |
|---|---|---|---|
| Viscosity | 8 cps | 8 cps | 8 cps |
| Filterability (0.8μ) | Neg. | pass freely | pass freely |
| Print Tests | — | Stable stream 13 to 45 KC | Stable stream 13 to 45 KC |
| Drying Time | — | 8 to 10 seconds | 1 to 2 seconds |
| Smearing | | smears | none |

Similar results as above are obtained using aqueous based magnetic inks containing other surfactants.
*Note: The magnetic moments measured in the modified inks, when corrected for the dilution effect, check very well with that of the original fluid, indicating good compatibility of the additives of the ink.

Even with the addition of glycerol and non-volatile solvent, problems still exist with respect to nozzle clogging due to formation of solid crusty residue by evaporation upon long term air exposure. Clogging and crust formation can also occur at other points in the magnetic jet printing apparatus. These difficulties have been overcome in the present invention by adding to the ink a substance which produces two effects. First of all, the substance imparts lubricity to the fluid so that the ink will run much easier along metal or plastic surfaces. Second, the added substance in the presence of air seems to develop a protective film around the fluid which prevents evaporation and drying of the ink itself. This protective fluid is very labile and can be easily removed under pressure or stirring. A very important requirement is that the additive substance should be perfectly compatible with the colloidal ink system, and also that it should not change the critical ink parameters such as magnetic moment, viscosity and stability.

Polyethylene diols of low molecular weight (below about 200 with a minimum molecular weight of about 100) and the monomethyl ethers thereof have been found capable of imparting the desired lubricity and evaporation preventing characteristics to the aqueous magnetic ink formulations. The polyethylene diol or monomethyl ether thereof is used in about 2 to 10% by volume.

With respect to the three components used in the present invention, preferred concentrations (by volume) are 8 to 10 percent for the glycerol, 1 to 5 percent for the non-volatile solvent and 2 to 8 for the polyethylene glycol or ether thereof. For best ink printing properties, concentrations of all three ingredients should be the same relative value within the broad ranges. That is, if an amount of one ingredient is selected to be near the low side of the specified range, the amounts of the other two ingredients should also be on the low side of the specified ranges. The mutual proportions of the three components in the mixture is important. For example, if a low concentration of glycerol (3 percent) and a large concentration of non-volatile solvent (7 percent) are selected, the resulting ink will dry too fast and the spots on the paper substrate will show feathering phenomenon. On the other hand, high concentrations of glycerol and polyethylene glycol (around 10–20%) and small concentrations of non-volatile 1 percent) will produce a slow drying ink which will smear on paper even after several minutes. The preferred proportions found empirically are glycerol 8% by volume, polyethylene glycol or ether 5% by volume and non-volatile solvent 4% by volume.

EXAMPLE

This example illustrates the preparation of a magnetic ink in accordance with the present invention.

As the magnetic particles, magnetite prepared by any prior art method coated with unsaturated fatty acid such as oleate, is used.

Wet, oleate-coated magnetite particles (190 grams) are added to a suitable mixing apparatus, such as an attritor, along with an antifoam agent, Ardefoam (2 grams) (mineral and silicon oils available from the Armak Division of Alzona Inc., of Chicago, Ill.), which will act as a bubble breaker during the magnetic printing operation. Thereafter, a mixture of cationic and non-ionic surfactants is added thereto, according to the following sequence and amounts: First, there is added 10 grams of solid Arquad 2H-75, a dimethyl dialkyl quaternary ammonium compound of 575 molecular weight wherein the alkyl groups are 24% saturated hexadecyl, 75% saturated octadecyl and 1% unsaturated octadecenyl and having 75% activity* (available from Armak Division). Next the non-ionic surfactant is added in 100 cc as a water solution containing 30 grams of Triton N-101 (a polyoxyethylenated nonylphenol containing 9 to 10 mols ethylene oxide per mol, available from Rohm & Haas Co.) and the mixture is intimately mixed in the attritor or blender for 10 minutes. Next, a modifying solution is added consisting of 20.8 grams of glycerol, 26.5 grams of polyethylene glycol (molecular weight MN 200) and 13.2 grams of Ethylene glycol monobutyl ether. The total mixture is processed in the attritor for 2 hours.

* Weight percentages in this specification are based on 100% activity of surfactants.

Following 2 hours in the attritor, the mixture is heated in a boiling bath of water for 3 hours, after which it is cooled to room temperature and centrifuged for 45 minutes at 3000 rpm. The fluid remaining after decantation is usable as a magnetic ink. Typical data for the magnetic ink is as follows:

| | |
|---|---|
| Magnetic moment | 25–30 emu/gram |
| Weight of ink | 400–450 grams |
| Viscosity | 11–17 cps |
| Surface Tension | 28–35 dynes/cm |
| pH | 6 – 8 |
| Resistivity | 300–500Ω |

In the above example another advantage of the present invention is illustrated. Electrolytes such as KOH can be avoided since it has been found that electrolytes tend to interfere with stream stability during ink jet printing, probably due to promoting formation of large micellar aggregates.

While the invention has been described in detail and with reference to specific embodiments thereof, it will be apparent to one skilled in the art that various changes and modifications can be made therein without departing from the spirit and scope thereof. For example, the glycol, non-volatile and polyethylene diol can be added separately or in any combination.

What we claim is:

1. In an aqueous ferrofluid wherein finely-divided magnetic material is dispersed by surface active agents, the improvement comprising including in said ferrofluid (1) 3 to 12 percent by volume glycerol, (2) 1 to 7 percent by volume of a lower alkyl monoether of ethylene glycol and (3) 2 to 10 percent by volume of polyethylene diol having a molecular weight below about 200 or the monomethyl ether thereof.

2. The aqueous ferrofluid of claim 1 wherein said finely-divided magnetic material is coated with an agent to prevent agglomeration thereof prior to dispersion in water.

3. The aqueous ferrofluid of claim 1 wherein said surface active agents are cationic, nonionic, anionic or mixtures thereof.

4. The aqueous ferrofluid of claim 3 wherein said surface active agents consist essentially of non-ionic and cationic surface active agents.

5. The aqueous ferrofluid of claim 1 comprising 8 to 10 percent by volume glycerol, 1 to 5 percent by volume lower alkyl monoether of ethylene glycol and 2 to 8 percent by volume polyethylene diol or monomethyl ether thereof.

6. The aqueous ferrofluid of claim 1 comprising about 8 percent by volume glycerol, about 4 percent by volume lower alkyl monoether of ethylene glycol and about 5 percent by volume of polyethylene diol or monomethyl ether thereof.

7. The aqueous ferrofluid of claim 1 wherein the polyethylene diol or monomethyl ether thereof has a molecular weight of about 100 to 200.

8. The aqueous ferrofluid of claim 1 wherein the lower alkyl monoether of ethylene glycol is selected from the group consisting of ethylene glycol mono-n-butyl ether, ethylene glycol monomethylether and ethylene glycol monoethyl ether.

9. The aqueous ferrofluid of claim 8 wherein the lower alkyl monoether of ethylene glycol is ethylene glycol mono-n-butyl ether.

10. In a process for preparing aqueous ferrofluids wherein finely divided magnetic material is dispersed by surface active agents, the improvements comprising adding to said fluid (1) 3 to 12 percent by volume glycerol, (2) 1 to 7 percent by volume lower alkyl monoether of ethylene glycol and (3) 2 to 10 percent by volume polyethylene diol having a molecular weight below about 200 or the monomethyl ether thereof and hot digesting said fluid while containing glycerol.

11. The process of claim 10 wherein said hot digestion is carried out for about 1 to 4 hours at about 60° to 90° C.

12. The process of claim 10 wherein said hot digestion is carried out for about 1.5 to 2.0 hours.

13. The process of claim 10 wherein said hot digestion is carried out at about 70° C.

14. The process of claim 10 wherein said finely-divided magnetic material is coated with an agent to prevent agglomeration thereof prior to dispersion in water.

15. The process of claim 10 wherein said surface active agents are cationic, nonionic, anionic or mixtures thereof.

16. The process of claim 10 wherein said surface active agents consist essentially of non-ionic and cationic surface active agents.

17. The process of claim 10 wherein 8 to 10 percent by volume glycerol, 1 to 5 percent by volume lower alkyl monoether of ethylene glycol and 2 to 8 percent by volume polyethylene diol or monomethyl ether thereof are added.

18. The process of claim 10 wherein about 8 percent by volume glycerol, about 4 percent by volume lower alkyl monoether of ethylene glycol and about 5 percent by volume of polyethylene diol or monomethyl ether thereof are added.

19. The process of claim 10 wherein the polyethylene diol or monomethyl ether thereof has a molecular weight of about 100 to 200.

20. The process of claim 10 wherein the lower alkyl monoether of ethylene glycol is selected from the group consisting of ethylene glycol mono-n-butyl ether, ethylene glycol monomethylether and ethylene glycol monoethyl ether.

21. The process of claim 10 wherein the lower alkyl monoether of ethylene glycol is ethylene glycol mono-n-butyl ether.

22. A magnetic ink jet printing composition of the aqueous ferrofluid of claim 1.

* * * * *